Sept. 27, 1949. R. F. CIANFRONE 2,482,901
FISHING LINE BRACKET
Filed Aug. 7, 1946
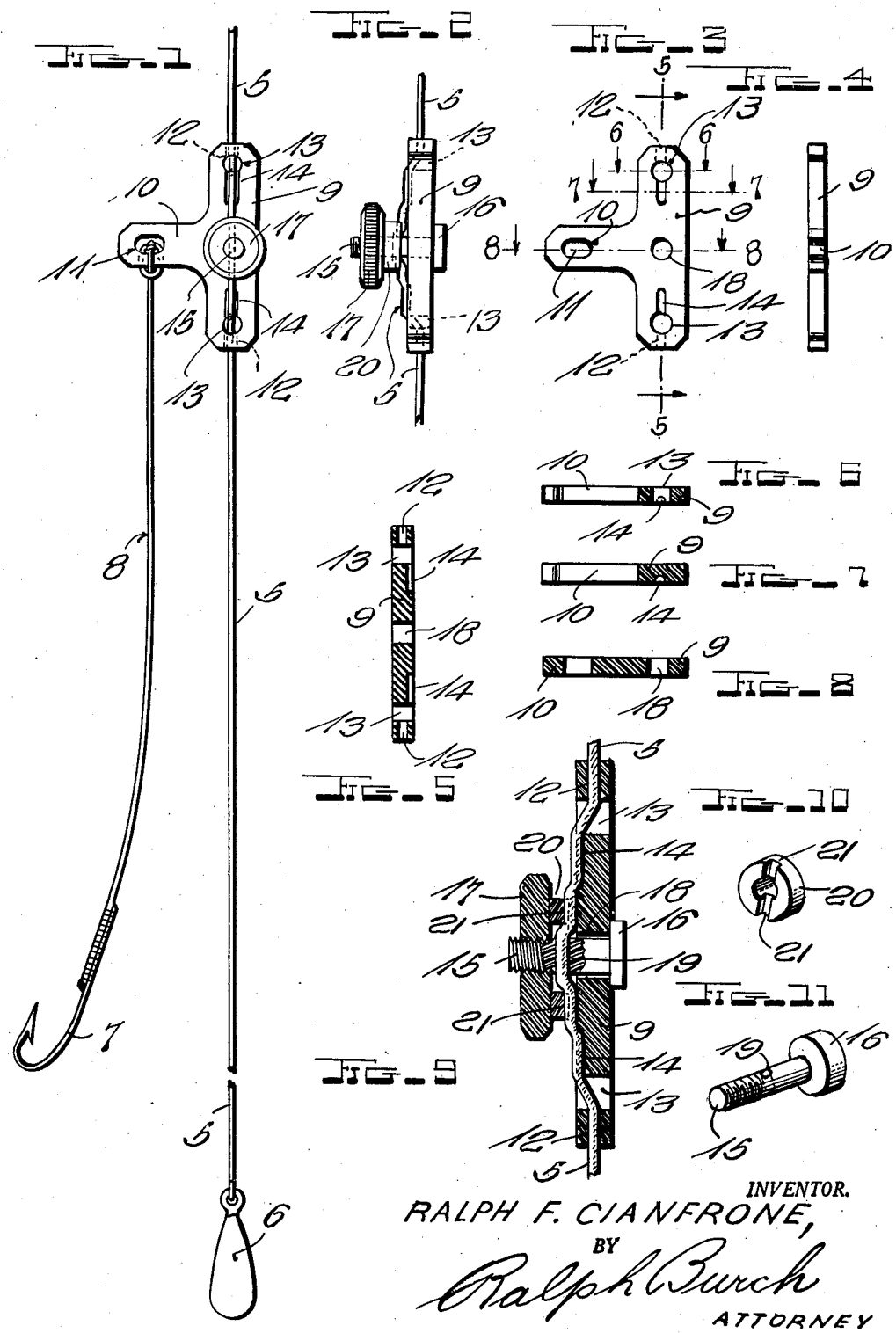
INVENTOR.
RALPH F. CIANFRONE,
BY
Ralph Burch
ATTORNEY Patented Sept. 27, 1949

2,482,901

UNITED STATES PATENT OFFICE 2,482,901

FISHING LINE BRACKET

Ralph F. Cianfrone, Guttenberg, N. J.

Application August 7, 1946, Serial No. 689,004

3 Claims. (Cl. 43—28)

1

This invention relates to an adjustable non-slip fishing line bracket for supporting fish hooks at various positions in relation to the fishing line sinker.

In fishing it is often necessary to adjust the fish hook at different distances from the sinker at the end of the fishing line in order that the hook will be suspended at a level in the water where the fish are feeding. As fish feed at various levels from the bottom of the water and it is not always known at which level they are feeding the fisherman finds it necessary to adjust the hook a number of times before the hook is positioned at the proper distance from the sinker. In the past the hook has been fastened to the fishing line by attaching the snell of the hook through a loop formed in the line and the adjustment of the hook has been a slow and troublesome task.

It is the primary object of the present invention to provide an adjustable bracket for attaching fish hooks to a fishing line which may be readily adjusted along the entire length of the line so the hook may be quickly and easily positioned at the desired distance from the sinker and securely fastened in its adjusted position without danger of slipping.

A further object of the invention resides in providing a bracket which is freely slidable on the fishing line and having positive clamping means for firmly securing the bracket to the line at any adjusted position.

Another object of the invention resides in providing a device of the above-mentioned character which is simple and durable in construction, efficient in performing its function and inexpensive to manufacture.

Other objects and advantages of the invention will be apparent during the course of the following description.

In the accompanying drawing forming a part of this specification and in which like numerals are employed to designate like parts throughout the same, Fig. 1 is a front elevational view of the bracket applied to a fishing line and showing the hook attached thereto, Fig. 2 is a side view of the bracket, Fig. 3 is a plan view of the bracket with the clamp removed, Fig. 4 is an edge view of the bracket shown in Fig. 3, Fig. 5 is a section taken on line 5—5 of Fig. 3, Fig. 6 is a section taken on line 6—6 of Fig. 3, Fig. 7 is a section taken on line 7—7 of Fig. 3,

2

Fig. 8 is a section taken on line 8—8 of Fig. 3,

Fig. 9 is an enlarged longitudinal sectional view of the bracket and clamp,

Fig. 10 is a detail perspective view of the clamping washer, and,

Fig. 11 is a detail perspective view of the clamping bolt.

In the drawing wherein for the purpose of illustration I have shown a preferred embodiment of my invention the numeral 5 denotes a fishing line having a conventional sinker 6 attached to its lower end. A hook 7 is attached to the bracket 9 by a snell 8 and to provide for the convenient adjustment of the position of the hook in relation to the sinker the bracket 9 for supporting the hook is adjustably mounted on the line 5.

The bracket 9 consists of an elongated block of plastic or other suitable material having intermediate its ends a laterally extending arm 10 provided with an elongated opening 11 in its end for attaching the snell 8 of the fish hook thereto. Each end of the bracket is provided with a central bore or passage 12 which intersect the transverse apertures 13. The fishing line 5 passes through the bores 12 and out of the apertures 13 so as to extend longitudinally across the face of the bracket. As the line passes from the apertures 13 it is received in grooves 14 formed in the face of the bracket which reduces the angle of the bend in the line and permits free sliding movement of the bracket along the line.

The bracket is secured in its adjusted position on the line by a positive clamp consisting of a bolt 15 having a head 16 at one end and a nut 17 threaded on its opposite end. The bolt is adapted to be inserted through a central opening 18 in the bracket and has a transverse opening 19 intermediate its ends to receive the line 5 extending across the face of the bracket. When the bolt is in position the plane of the opening 19 is slightly above the face of the bracket, as clearly shown in Fig. 9. A clamping washer 20 is mounted on the bolt between the nut and face of the bracket and has opposed grooves 21 in its clamping face to receive the line 5. Upon turning the nut 17 the washer 20 is forced into or released from clamping engagement with the line 5 permitting the bracket to be readily adjusted and positively secured in its adjusted position.

A fishing line equipped with my improved bracket provides means for freely suspending the fish hook in spaced parallel relation to the line and may be quickly adjusted along the line to position the hook at any distance from the sinker. When the nut 17 is loosened the bracket is free to slide longitudinally of the line and upon tightening the nut the bracket is clamped firmly to the line holding it in its adjusted position.

It is to be understood the form of my invention herein shown and described is to be taken as a preferred example of the same and certain changes in the shape, size and arrangement of the parts may be made within the spirit of the invention or scope of the subjoined claims.

Having thus described my invention, I claim:

1. A fishing line bracket for supporting a fish hook comprising a body having longitudinal bores in each end opening through the face of the body for passing the fishing line therethrough, a bolt extending through said body intermediate its ends and having an aperture therethrough in a plane spaced from the plane of the face of said body through which the fishing line passes, and a clamping member on the end of said bolt for securing the fishing line in clamping engagement with the body.

2. An adjustable fish hook hanger for fishing lines comprising an elongated body having a lateral arm for supporting a fish hook, the ends of said body having alined bores opening into transverse apertures through the face of said body, a bolt extending through the center of said body and having a transverse aperture, said bores and aperture of said bolt being adapted to receive the fishing line which passes through the bores and aperture to slidably support the body of the hanger, and a clamping member on said bolt for clamping the fishing line against said body to secure the hanger in its adjusted position.

3. An adjustable fish hook hanger for fishing lines comprising an elongated body having a lateral arm for supporting a fish hook, the end of said body having longitudinal bores communicating with the face of the body through which the fishing line is adapted to pass to slidably support the hanger, a stud projecting from the body intermediate its ends and having a transverse aperture through which the fishing line is adapted to pass, a nut threaded on said stud, and a clamping washer between said nut and body having a transverse groove to receive the fishing line and hold it in clamping engagement with said body to secure the hanger in its adjusted position.

RALPH F. CIANFRONE.

REFERENCES CITED

The following references are of record in the file of this patent:

UNITED STATES PATENTS

| Number | Name | Date |
|---|---|---|
| 473,503 | Herring | Apr. 26, 1892 |
| 726,185 | Newsam | Apr. 21, 1903 |
| 779,286 | Kramer | Jan. 3, 1905 |
| 1,047,654 | Klersy | Dec. 17, 1912 |
| 1,970,752 | Hughes | Aug. 21, 1934 |
| 2,432,636 | Van Vleet | Dec. 16, 1947 |

FOREIGN PATENTS

| Number | Country | Date |
|---|---|---|
| 87,247 | Germany | June 24, 1896 |